Patented Feb. 21, 1939

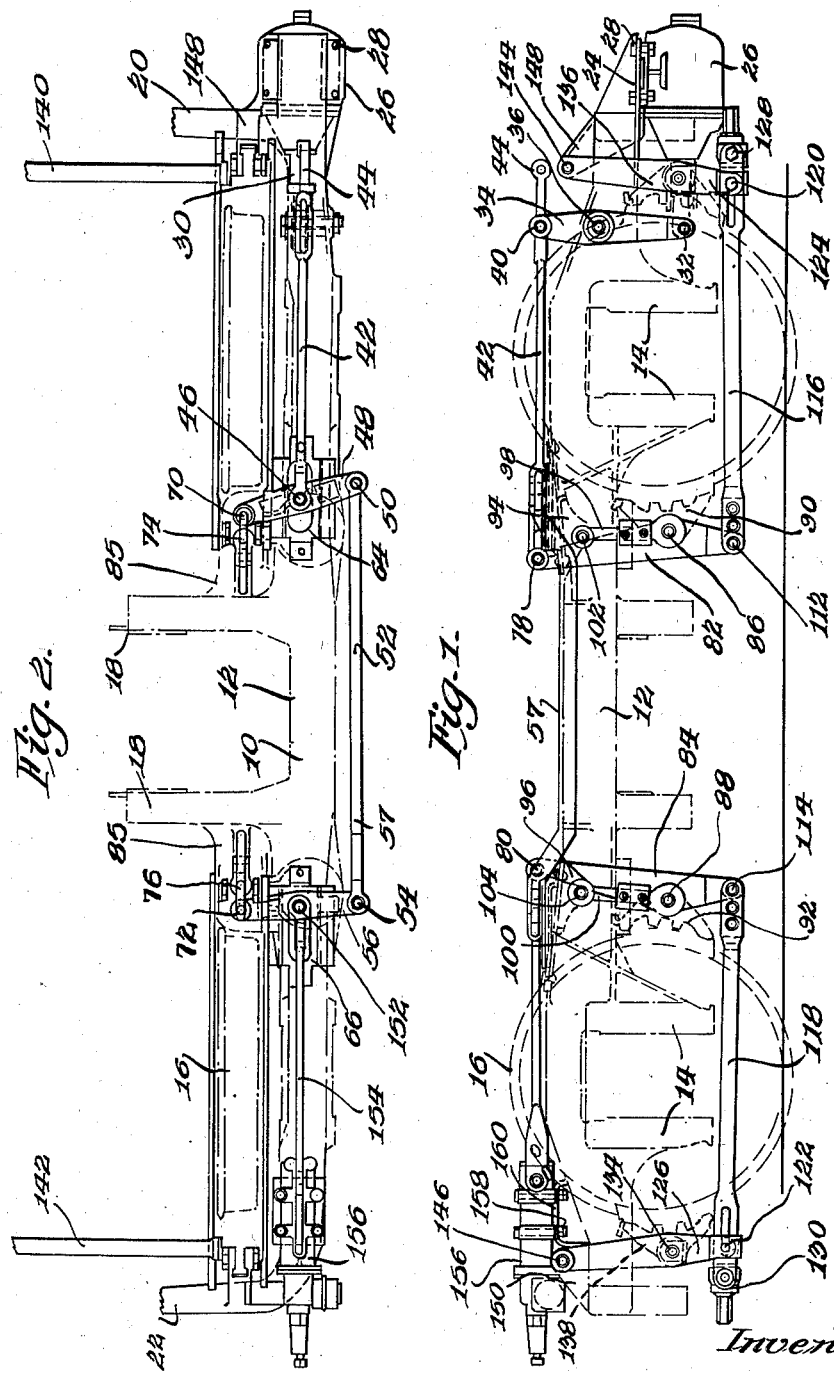

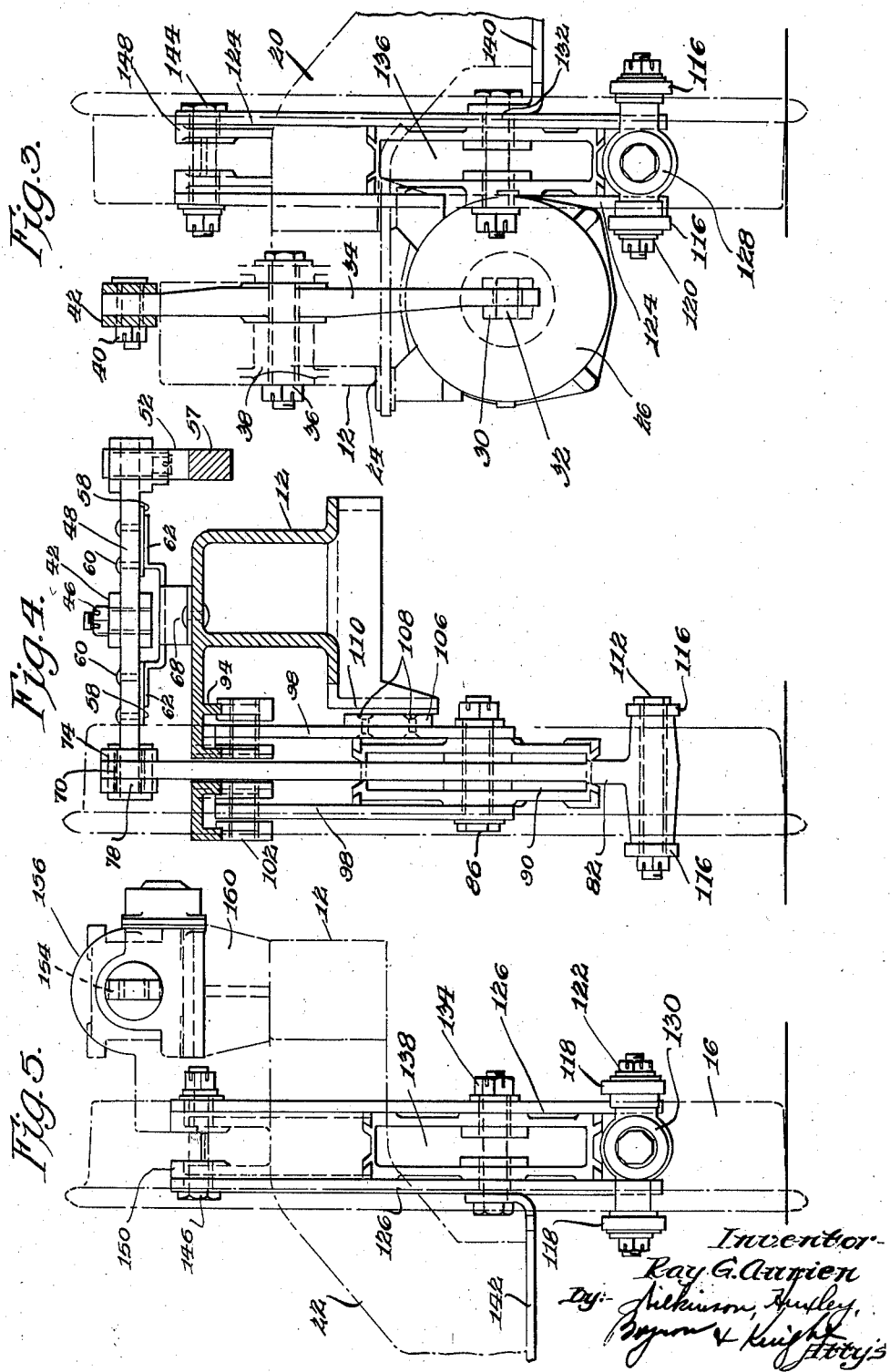

2,148,362

UNITED STATES PATENT OFFICE 2,148,362

BRAKE ARRANGEMENT

Ray G. Aurien, Chicago, Ill., assignor to American Steel Foundries, Chicago, Ill., a corporation of New Jersey Application November 10, 1936, Serial No. 110,177

31 Claims. (Cl. 188—56)

This invention pertains to brake rigging, and more particularly to a brake arrangement adapted for use on high speed motor trucks.

It is an object of this invention to provide a brake arrangement wherein the brakes at opposite sides of the truck are operated by separate cylinders located at opposite corners on one end of the truck.

Another object is to provide a low center of gravity truck wherein the brake operating cylinders are located below the top of the truck frame.

Yet another object is to provide a unit cylinder brake arrangement having the cylinders therefor located at one end of the truck, and wherein the slack adjusters are disposed at the opposite end of the truck.

A further object of the invention is to provide a brake arrangement for a high speed truck wherein the automatic slack adjusters are connected to the brake rigging intermediate the ends of said brake rigging.

A still further object is to provide a brake arrangement for a high speed truck wherein the operating means for said brake rigging and the operating connections therefor are outboard of the wheels to permit the unrestricted mounting of the motors between the wheels.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 1 is a side elevation of a truck having brake rigging embodying the invention applied thereto;

Figure 2 is a fragmentary top plan view of one side of the truck illustrated in Figure 1 showing the brake rigging applied thereto, but with the truck levers omitted;

Figure 3 is a fragmentary end elevation of the truck and brake rigging illustrated in Figures 1 and 2, the same looking toward the left as viewed in said figures;

Figure 4 is a transverse sectional elevation taken substantially in the plane of the transverse center line of said truck;

Figure 5 is an end elevation of the truck and brake construction illustrated in Figures 1 and 2, the same looking toward the right as viewed in said figures.

In the truck construction contemplated herein, the brake arrangement and the operating means therefor are the same for opposite sides of the truck, that is, two cylinders are located on opposite corners of one end of the truck for operating the brake rigging, and therefore the construction herein will be described as applied to one side of the truck only.

In the construction shown, the truck frame 10 includes the side frame 12 provided with pedestals 14 adapted to have cooperative engagement with journal means (not shown) of the wheel and axle assembly 16, the truck herein shown being a four-wheel type of truck. The side frames at opposite sides of the truck are connected by means of the spaced transoms 18 adapted to accommodate the usual bolster (not shown) and said spaced side frames are connected adjacent the ends thereof by means of the end rails 20 and 22. The end rail 20 is provided with the outwardly extending bracket 24 disposed below the top of the side frame and having the operating cylinder 26 connected thereto as at 28, said cylinder being disposed below said bracket. The inwardly extending piston 30 of said cylinder is pivotally connected as at 32 to the lower end of the vertically disposed dead cylinder lever 34, said cylinder lever 34 being pivotally connected as at 36 to a suitable bracket 38 provided on said side frame.

The upper end of said dead cylinder lever extends through a slot in the side frame and is pivotally connected as at 40 to the pull rod 42, the pull rod being provided with an outwardly extending end portion 44 adapted for connection to suitable hand brake operating means. The inner end of said pull rod is pivotally connected as at 46 to the horizontally disposed live auxiliary lever 48, the outer end of said auxiliary lever being connected as at 50 to the pull rod 52, the opposite end of which is connected as at 54 to a dead auxiliary lever 56. The pull rod 52 is preferably offset downwardly as at 57 so that the major portion thereof is substantially at the level of the adjacent side frame.

The auxiliary levers 48 and 56 are preferably provided with spaced wear plates 58 secured thereto as at 60 and adapted for sliding support on the spaced bracket members 62 of the brackets 64 and 66, respectively, said brackets being suitably secured as at 68 to the top of the truck side frame. The inner ends of the live auxiliary levers 48 and 56 are pivotally connected as at 70 and 72 to clevices 74 and 76, said clevices being pivotally connected as at 78 and 80 to the upper ends of the live truck levers 82 and 84. The truck levers 82 and 84 extend downwardly through slots in the brackets 85 disposed between the transoms and the side frame, and are pivotally connected as at 86 and 88 to the brake heads 90 and 92, said heads being provided with suitable shoes adapted to have braking cooperation with the inner peripheries of the adjacent wheels.

The truck frame is provided with suitable brackets 94 and 96, and brake hangers 98 and 100 are pivotally connected as at 102 and 104 to said brackets. The outer brake hangers are preferably provided with wear plates 106 secured to said hangers as at 108 and being disposed adjacent the bracket 110 provided on the truck frame. The lower ends of said brake hangers are pivotally connected as at 86 and 88 to said brake heads 90 and 92. The lower ends of the truck levers 82 and 84 are pivotally and adjustably connected as at 112 and 114 to the straps 116 and 118 disposed on each side of the adjacent wheels, the outer ends of said straps being connected as at 120 and 122 to the lower end of the dead truck levers 124 and 126 through the manual slack adjusters 128 and 130.

The truck levers 124 and 126 are pivotally connected as at 132 and 134 to the brake heads 136 and 138, and opposite truck levers are connected by means of the tie straps 140 and 142. The outer brake heads 136 and 138 are likewise provided with suitable shoes adapted for braking cooperation with the outer periphery of adjacent wheels. The upper ends of the truck levers 124 and 126 are pivotally connected as at 144 and 146 to brackets 148 and 150 provided on the respective end rails 20 and 22.

The dead lever 56 is pivotally connected intermediate its ends as at 152 to the pull rod 154, the opposite end of said pull rod being suitably connected to the automatic slack adjuster 156, said slack adjuster being connected as at 158 to a suitable bracket 160 provided on the depressed end of the truck frame adjacent the end rail 22.

With the brake arrangement such as contemplated here, assuming the brakes to be in released position, when it is desired to set such brakes, fluid pressure is admitted to the respective cylinders 26. Movement of the piston 30 of each cylinder inboard of the truck, or toward the left as viewed in Figures 1 and 2, causes the dead cylinder lever 34 to be moved in a clockwise direction. The pull rod 42 moves the live lever 48 toward the right as viewed in Figure 2, whereupon the upper end of the live truck lever 82 is caused to be moved toward the right, engaging the shoe of the head 90 with the inner periphery of the adjacent wheel. Thus, the truck lever 82 will be moved in a clockwise direction about the pivot 86, causing the pull rod 116 to move the lower end of the dead truck lever 124 to engage the shoe of the head 136 with the outer periphery of the adjacent wheel. Movement of the live lever 48 will also cause movement of the pull rod 52 toward the right as viewed in Figure 2, moving the lever 56 in a counter-clockwise direction about the pivot 152. Movement of the lever 56 in a counter-clockwise direction causes the upper end of the live truck lever 84 to move toward the left as viewed in Figure 1, applying the brake shoe of the head 92 to the inner periphery of the adjacent wheel. The truck lever 84 will therefore move in a counter-clockwise direction about the pivot 88, causing the pull rod 118 to move the dead truck lever 126 in a counter-clockwise direction about the pivot 146 to apply the brake shoe 138 to the outer periphery of the adjacent wheel. Release is accomplished by movement of the brake rigging in a direction opposite to that described. Slack is controlled both by the hand operated slack adjusters and during operation of the truck by the automatic slack adjuster.

It will be appreciated that with this arrangement of brake rigging and operating means a truck having a low center of gravity is provided, one in which brake leverages are utilized to the fullest extent, and one wherein ample space is provided between the wheels for the unrestricted mounting of the motors.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers, an operating cylinder supported adjacent one of said end rails and below the same, a cylinder lever pivoted intermediate the ends thereof to said truck frame and connected adjacent the lower end thereof to the piston of said cylinder, the upper end of said cylinder lever being operatively connected to the connection between said live truck levers.

2. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers, an operating cylinder supported adjacent one of said end rails and below the same, a cylinder lever pivoted intermediate the ends thereof to said truck frame and connected adacent the lower end thereof to the piston of said cylinder, the upper end of said cylinder lever being operatively connected to the connection between said live truck levers, and an automatic slack adjuster disposed adjacent another end rail and operatively connected to the connection between said live truck levers.

3. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers, a cylinder lever pivoted intermediate the ends thereof to said truck frame and connected adjacent one end thereof to the connection between said live levers, and operating means connected to the other end of said cylinder lever.

4. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers, a cylinder lever pivoted intermediate the ends thereof to said truck frame and connected adjacent one end thereof to the connection between said live levers, operating means connected to the other end of said cylinder lever, and a slack adjuster disposed adjacent another end rail and operatively connected to the connection between said live truck levers.

5. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers, an operating cylinder supported adjacent one of said end rails and below the same, a cylinder lever pivoted intermediate the ends thereof to said truck frame and connected adjacent the lower end thereof to the piston of said cylinder, the upper end of said cylinder lever being operatively connected to the connection between said live truck levers, and a slack adjuster connected to the connection between said live truck levers.

6. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers, a cylinder lever pivoted intermediate the ends thereof to said truck frame and connected adjacent one end thereof to the connection between said live levers, operating means connected to the other end of said cylinder lever, and a slack adjuster connected to the connection between said live truck levers.

7. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers including horizontally disposed auxiliary levers connected adjacent the inner ends to the adjacent live truck lever, a pull rod connected to the outer ends of said auxiliary levers, an operating cylinder supported adjacent one of said end rails and below the same, a cylinder lever pivoted intermediate the ends thereof to said truck frame and connected adjacent the lower end thereof to the piston of said cylinder, the upper end of said cylinder lever being operatively connected to one of said auxiliary levers, and a pivotal connection for the other of said auxiliary levers.

8. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers including horizontally disposed auxiliary levers connected adjacent the inner ends to the adjacent live truck lever, a pull rod connected to the outer ends of said auxiliary levers, an operating cylinder supported adjacent one of said end rails and below the same, a cylinder lever pivoted intermediate the ends thereof to said truck frame and connected adjacent the lower end thereof to the piston of said cylinder, the upper end of said cylinder lever being operatively connected to one of said auxiliary levers, a pivotal connection for the other of said auxiliary levers including an automatic slack adjuster disposed adjacent another end rail.

9. In a brake arrangement, the combination of a truck frame including a side frame, end rails and transom members, spaced wheel and axle assemblies disposed in supporting relation to said truck frame, brake mechanism for said wheels, an operating cylinder supported adjacent one of said end rails and below the same, a cylinder lever pivoted intermediate the ends thereof to said truck frame and connected adjacent the lower end thereof to the piston of said cylinder, the upper end of said cylinder lever being operatively connected to said brake mechanism.

10. In a brake arrangement, the combination of a truck frame including a side frame, end rails and transom members, spaced wheel and axle assemblies disposed in supporting relation to said truck frame, brake mechanism for said wheels, an operating cylinder supported adjacent one of said end rails and below the same, a cylinder lever pivoted intermediate the ends thereof to said truck frame and connected adjacent the lower end thereof to the piston of said cylinder, the upper end of said cylinder lever being operatively connected to said brake mechanism, and an automatic slack adjuster disposed adjacent another end rail and operatively connected to said brake mechanism.

11. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers including horizontally disposed auxiliary levers connected adjacent the inner ends to the adjacent live truck lever, a pull rod connected to the outer ends of said auxiliary levers, an operating cylinder supported adjacent one of said end rails and below the same, a cylinder lever pivoted intermediate the ends thereof to said truck frame and connected adjacent the lower end thereof to the piston of said cylinder, the upper end of said cylinder lever being operatively connected to one of said auxiliary levers intermediate its ends, and a pivotal connection for the other of said auxiliary levers connected thereto intermediate the ends of said auxiliary lever.

12. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers including horizontally disposed auxiliary levers connected adjacent the inner ends to the adjacent live truck lever, a pull rod connected to the outer ends of said auxiliary levers, an operating cylinder supported adjacent one of said end rails and below the same, a cylinder lever pivoted intermediate the ends thereof to said truck frame and connected adjacent the lower end thereof to the piston of said cylinder, the upper end of said cylinder lever being operatively connected to one of said auxiliary levers intermediate its ends, a pivotal connection for the other of said auxiliary levers connected thereto intermediate the ends of said auxiliary lever, and an automatic slack adjuster disposed adjacent another end rail.

13. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers, an operating cylinder supported adjacent one of said end rails and below the top level of the truck frame, a cylinder lever pivoted intermediate the ends thereof to said truck frame and connected adjacent the lower end thereof to the piston of said cylinder, the upper end of said cylinder lever being operatively connected to the connection between said live truck levers.

14. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers, an operating cylinder disposed outboard of said wheels and supported adjacent one of said end rails and below the top level of the truck frame, a cylinder lever pivoted intermediate the ends thereof to said truck frame and connected adjacent the lower end thereof to the piston of said cylinder, the upper end of said cylinder lever being operatively connected to the connection between said live truck levers.

15. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers, an operating cylinder disposed outboard of said wheels and supported adjacent one of said end rails and below the top level of the truck frame, a cylinder lever pivoted intermediate the ends thereof to said truck frame and connected adjacent the lower end theerof to the piston of said cylinder, the upper end of said cylinder lever being operatively connected to the connection between said live truck levers, and a slack adjuster connected to said connection between the live truck levers.

16. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers including horizontally disposed auxiliary levers connected adjacent the inner ends to the adjacent live truck lever, a pull rod connected to the outer ends of said auxiliary levers, an operating cylinder disposed outboard of said wheels and supported adjacent one of said end rails and below the top level of the truck frame, a cylinder lever pivoted intermediate the ends thereof to said truck frame and connected adjacent the lower end thereof to the piston of said cylinder, the upper end of said cylinder lever being operatively connected to one of said auxiliary levers, and a pivotal connection for the other of said auxiliary levers.

17. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers including horizontally disposed auxiliary levers connected adjacent the inner ends to the adjacent live truck lever, a pull rod connected to the outer ends of said auxiliary levers, an operating cylinder disposed outboard of said wheels and supported adjacent one of said end rails and below the top level of the truck frame, a cylinder lever pivoted intermediate the ends thereof to said truck frame and connected adjacent the lower end thereof to the piston of said cylinder, the upper end of said cylinder lever being operatively connected to one of said auxiliary levers, and a pivotal connection for the other of said auxiliary levers including an automatic slack adjuster disposed adjacent another end rail.

18. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers including horizontally disposed auxiliary levers connected adjacent the inner ends to the adjacent live truck lever, a pull rod connected to the outer ends of said auxiliary levers, an operating cylinder disposed outboard of said wheels and supported adjacent one of said end rails and below the top level of the truck frame, a cylinder lever pivoted intermediate the ends thereof to said truck frame and connected adjacent the lower end thereof to the piston of said cylinder, the upper end of said cylinder lever being operatively connected to one of said auxiliary levers, and a pivotal connection for the other of said auxiliary levers including a slack adjuster connected to the other of said auxiliary levers.

19. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers, a substantially vertically disposed cylinder lever pivoted to said truck frame and to the connection between said live levers, and an operating cylinder supported adjacent one of said end rails and connected to said cylinder lever for operating said brake mechanism.

20. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers, a cylinder lever pivoted to said truck frame and to the connection between said live levers, and an operating cylinder supported adjacent one of said end rails and having an inwardly extending piston connected to said cylinder lever for operating said brake mechanism.

21. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers, a substantially vertically disposed cylinder lever pivoted to said truck frame and to the connection between said live levers, an operating cylinder supported adjacent one of said end rails and connected to said cylinder lever for operating said brake mechanism, and an automatic slack adjuster disposed adjacent another end rail and operatively connected to said brake mechanism.

22. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers, a cylinder lever pivoted to said truck frame and to the connection between said live levers, an operating cylinder supported adjacent one of said end rails and having an inwardly extending piston connected to said cylinder lever for operating said brake mechanism, and an automatic slack adjuster disposed adjacent another end rail and operatively connected to said brake mechanism.

23. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers including interconnected horizontally disposed auxiliary levers connected to the adjacent live truck levers, an operating cylinder supported adjacent one of said end rails, and a substantially vertically disposed cylinder lever pivoted to said truck frame and being connected to the piston of said cylinder and one of said auxiliary levers whereby said brake mechanism is operated.

24. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers including interconnected horizontally disposed auxiliary levers connected to the adjacent live truck levers, an operating cylinder supported adjacent one of said end rails and having an inwardly extending piston, and a cylinder lever pivoted to said truck frame and being connected to the piston of said cylinder and one of said auxiliary levers whereby said brake mechanism is operated.

25. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers including interconnected horizontally disposed dead and live auxiliary levers connected to the adjacent live truck levers, an operating cylinder supported adjacent one of said end rails, and a substantially vertically disposed cylinder lever pivoted to said truck frame and being connected to the piston of said cylinder and said live auxiliary lever whereby said brake mechanism is operated.

26. In a brake arrangement, the combination of a truck frame including a side frame, end rails and transom members, spaced wheel and axle assemblies disposed in supporting relation to said truck frame, brake mechanism for said wheels, said brake mechanism including a dead truck lever located in the plane of the adjacent wheel and pivoted adjacent the upper end thereof to said truck frame, a live truck lever disposed on the opposite side of said wheel, a connection between said truck levers below the axle level, a dead truck lever disposed in the plane of another wheel and pivoted adjacent the upper end to the truck frame, a live lever disposed on the opposite side of said last named wheel, a connection between said last named dead and live levers, a connection between said live levers including interconnected horizontally disposed dead and live auxiliary levers connected to the adjacent live truck levers, an operating cylinder supported adjacent one of said end rails and having an inwardly extending piston, and a cylinder lever pivoted to said truck frame and being connected to the piston of said cylinder and said live auxiliary lever whereby said brake mechanism is operated.

27. In a brake arrangement, the combination of a truck frame including a side frame, end rails and transom members, spaced wheel and axle assemblies disposed in supporting relation to said truck frame, brake mechanism for each of said wheels, means interconnecting brake mechanism on each side of said assemblies, operating means for said brake mechanism, said means including an operating cylinder supported adjacent one of said end rails, and a substantially vertically disposed cylinder lever pivoted intermediate the ends thereof to said truck frame, one of the ends of said cylinder lever being connected to the piston of said cylinder and the other end being operatively connected to said brake mechanism on one side of said assemblies.

28. In a brake arrangement, the combination of a truck frame including a side frame, end rails and transom members, spaced wheel and axle assemblies disposed in supporting relation to said truck frame, brake mechanism for each of said wheels, means interconnecting brake mechanism on each side of said assemblies, operating means for said brake mechanism, said means including an operating cylinder supported adjacent one of said end rails, a substantially vertically disposed cylinder lever pivoted intermediate the ends thereof to said truck frame, one of the ends of said cylinder lever being connected to the piston of said cylinder and the other end being operatively connected to said brake mechanism, and an automatic slack adjuster disposed adjacent another end rail and operatively connected to said brake mechanism on one side of said assemblies.

29. In a brake arrangement, the combination of a truck frame, spaced wheel and axle assemblies disposed in supporting relation to said truck frame, brake mechanism for each of said wheels, means interconnecting brake mechanism on each side of said assemblies, operating means for said brake mechanism, said means including an operating cylinder supported adjacent one of the corners of said truck frame, and a substantially vertically disposed cylinder lever pivoted intermediate the ends thereof to said truck frame, one of the ends of said cylinder lever being connected to the piston of said cylinder and the other end being operatively connected to said brake mechanism on one side of said assemblies.

30. In a brake arrangement, the combination of a truck frame, spaced wheel and axle assemblies disposed in supporting relation to said truck frame, brake mechanism for each of said wheels, means interconnecting brake mechanism on each side of said assemblies, operating means for said brake mechanism, said means including an operating cylinder supported adjacent one of the corners of said truck frame, a substantially vertically disposed cylinder lever pivoted intermediate the ends thereof to said truck frame, one of the ends of said cylinder lever being connected to the piston of said cylinder and the other end being operatively connected to said brake mechanism, and an automatic slack adjuster disposed adjacent another corner of said truck frame and operatively connected to said brake mechanism on one side of said assemblies.

31. In a brake arrangement, the combination of a truck frame, spaced wheel and axle assemblies disposed in supporting relation to said truck frame, brake mechanism for said wheels, said brake mechanism including a live lever on one side of each of said wheels and a dead lever on the other side thereof, means interconnecting said levers on each side of said assemblies, operating means for said brake mechanism, said means including an operating cylinder supported adjacent one of the corners of said truck frame, and a substantially vertically disposed cylinder lever pivoted intermediate the ends thereof to said truck frame, one of the ends of said cylinder lever being connected to the piston of said cylinder and the other end being operatively connected to said brake mechanism on one side of said assemblies.

RAY G. AURIEN.